United States Patent [19]

Beerenwinkel

[11] 4,224,848
[45] Sep. 30, 1980

[54] CROSS CUTTER FOR ROLLS OF MATERIALS

[75] Inventor: Dieter Beerenwinkel, Düsseldorf, Fed. Rep. of Germany

[73] Assignee: Jagenberg Werke Atkiengesellschaft, Dusseldorf, Fed. Rep. of Germany

[21] Appl. No.: 946,689

[22] Filed: Sep. 28, 1978

[30] Foreign Application Priority Data

Oct. 21, 1977 [DE] Fed. Rep. of Germany ....... 2747256

[51] Int. Cl.² ............................................. B26D 5/24
[52] U.S. Cl. ............................................. 83/76; 83/344
[58] Field of Search .................. 83/72, 76, 342, 344

[56] References Cited

U.S. PATENT DOCUMENTS

| | | | |
|---|---|---|---|
| 3,071,999 | 1/1963 | Thorn | 83/76 |
| 3,195,385 | 7/1965 | Paterson | 83/76 |
| 3,604,300 | 6/1969 | Allison et al. | 83/76 |
| 4,020,406 | 4/1977 | Tokuno et al. | 83/76 X |

FOREIGN PATENT DOCUMENTS 648106  9/1962  Canada ........................................ 83/76

*Primary Examiner*—James G. Smith
*Attorney, Agent, or Firm*—Sprung, Felfe, Horn, Lynch & Kramer

[57] ABSTRACT

A cross cutter for a web of goods comprises 2 coupled cutter rolls which are driven at the moment of cutting in synchronism with the webs of goods. The driving of the rolls is carried out by a driving motor, an adjustable asymmetrical coupler mechanism and a mechanism for controlling the number of revolutions per unit time of the driving motor. The cutter rolls are directly driven by the driving motor and parallel to the asymmetrical mechanism and the control mechanism is receptive of the actual number of revolutions as a control input from the asymmetrical mechanism.

3 Claims, 2 Drawing Figures

CROSS CUTTER FOR ROLLS OF MATERIALS

BACKGROUND OF THE INVENTION

The present invention relates to a cross cutter for webs of material, comprising cutting means including two cutter rolls coupled together and having knives thereon and a drive having a driving motor and especially an adjustable asymmetrical mechanism (coupler mechanism) driving the cutter rolls, at the moment of the cut, in synchronism with the web of material.

In a known cross cutter of this type the asymmetrical mechanism is arranged between the driving motor and the cutter rolls and rigidly coupled with a cutter roll shaft, with the cutter rolls rigidly coupled together.

At a uniform speed of the motor, the asymmetrical mechanism has the effect that the cutter rolls are accelerated and retarded during a revolution. This control of the speed of rotation of the cutter rolls makes possible, in the case of synchronism between web of material and knives, on the one hand a shear cut and, on the other hand, the independence of the sheet length from the circumference of the cutter rolls.

Since, at a uniform speed of the driving motor, the forces for the acceleration and retardation of the cutter rolls are absorbed by the asymmetrical mechanism and because of the large mass of the cutter rolls these forces are substantial, the drive must therefore be sturdily constructed. With the complexity of an asymmetrical mechanism this means a substantial cost factor. (Jagenberg "Technische Informationen ti", III/302).

SUMMARY OF THE INVENTION

The invention has the object of creating a cross cutter of the type mentioned at the outset, wherein the asymmetrical mechanism can be less sturdy and thus more reasonably priced.

This object is achieved in accordance with the invention by a cross cutter of the kind mentioned above wherein cutter rolls are driven by the driving motor directly and parallel to the asymmetrical mechanism and that, for the control of the speed of the driving motor, there is provided a control device to which the asymmetrical mechanism delivers the actual value corresponding to its number of revolutions as a control input.

Since in the cross cutter, according to the invention, the asymmetrical mechanism is no longer arranged between driving motor and cutter rolls but parallel thereto, it only has control functions so that it can accordingly be constructed in a less sturdy manner. The forces for accelerating and retarding the cutter rolls are now absorbed by the driving motor, which acts as a motor during the acceleration and as a generator during the retardation.

In one embodiment of the invention the control device comprises a speed regulating device, especially with a P.I.D. characteristic and a current regulator, especially with a P.I.D. characteristic, whereby the current regulator receives the output of the speed regulating device as a control input and whereby the output of the current regulator is fed to a power amplifier for the driving motor supplying another control input to the current regulator. The power amplifier can have thyristors as control elements, which are triggered by an impulse generator arranged between the current regulator and the power amplifier and which conducts in both directions so that the power supply to the power amplifier is possible during the motor operation as well as during the generator operation.

BRIEF DESCRIPTION OF THE DRAWINGS

The invention will be further explained below with the aid of the drawings representing an embodiment wherein.

DETAILED DESCRIPTION OF THE INVENTION

Figure 1:
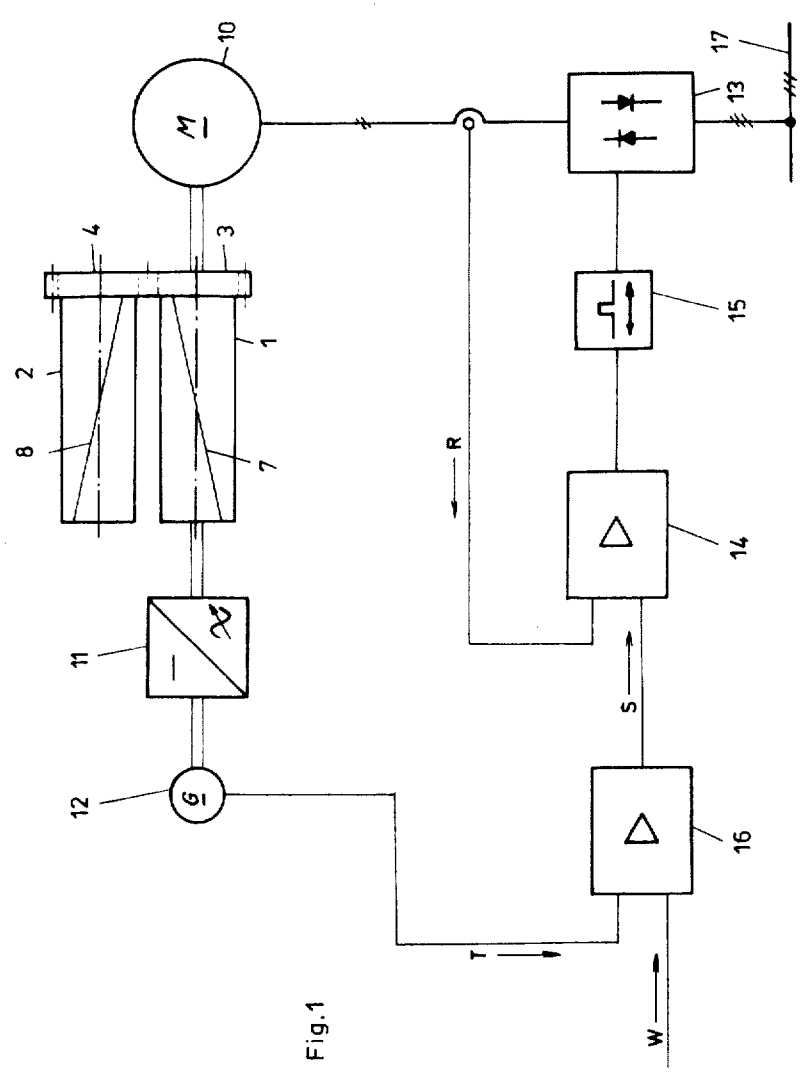
FIG. 1 is a schematic representation of a cross cutter having a control device.
Figure 2:
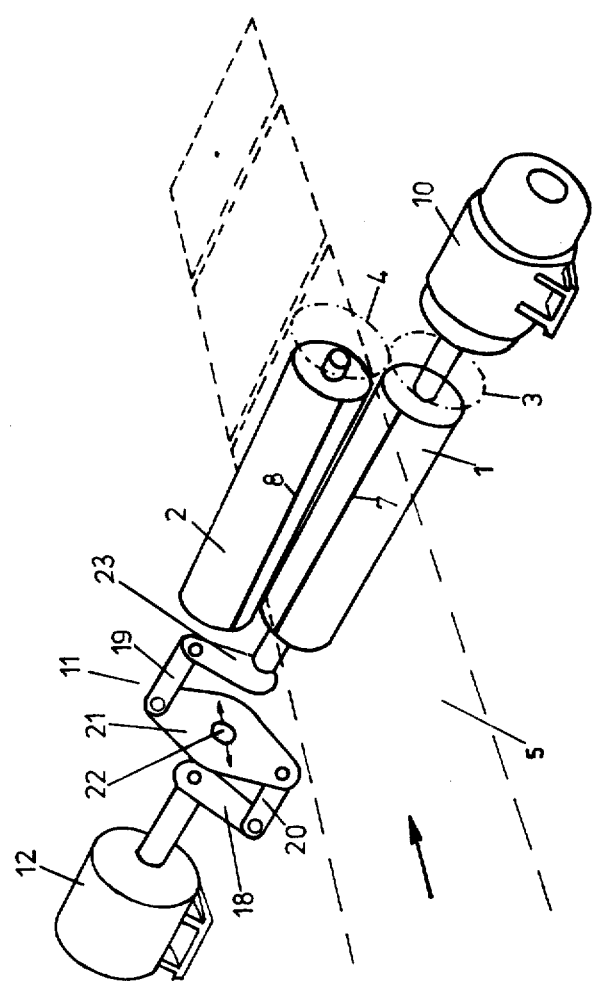
FIG. 2 is a perspective representation of a cross cutter with driving motor, asymmetrical mechanism and tachometer generator.

As shown in FIGS. 1 and 2, the cross cutter includes two cutter rolls 1, 2 coupled together by way of cogwheels 3,4. On the surface of the cutter rolls 1, 2 there are arranged oblique knives 7, 8 which cut a web of goods 5 transversely in a shear cut during the rotation of the cutter rolls 1, 2. The shaft of the cutter roll 1 is, in some embodiments, coupled with a driving motor 10 by way of a reduction gear (not shown). The driving motor 10 drives, parallel to the cutter rolls 1, 2, an asymmetrical mechanism in the form of a coupler mechanism 11. Connected at the other end of the coupler mechanism 11 is a tachometer generator 12.

The driving motor 10 is supplied by way of a power amplifier 13 by the power supply 17. The power amplifier 13 includes thyristors which enable current flow in both directions. The thyristors are controlled by a current regulator 14 having a P.I.D. control characteristic wherein the output is proportional to a linear combination of the input, the time integral of the input and the time rate of change of the input, by way of an impulse generator 15 whose control pulses for switching in the thyristors can be phase shifted periodically.

The current regulator 14 for which the power amplifier 13 and the pulse generator 15 represents the controlled system obtains from the output of the power amplifier 13, the control input R. In addition, it receives from a speed regulating device 16, having a P.I.D. control characteristic its output S as a control input. The speed regulating device 16, for which the power amplifier 13 the current regulator 14, the driving motor 10, the coupler mechanism 11 and the tachometer generator 12 represent the controlled system, receives from the tachometer generator 12 the control input T. The reference input W is obtained from externally of the system.

In the cross cutter shown in FIG. 2 the coupler mechanism 11 is connected to the shaft of the cutter roll 1 which is integral with the driving shaft of the motor 10. The coupler mechanism 11 comprises an input crank 18 and an output crank 17. The free ends of the two cranks 17, 18 are flexibly connected by way of joined link members 19, 20 with a correcting element 21 whose axis of rotation 22 is adjustable on a pin guide which is not shown, in the direction of the two drawn-in arrows for the adjustment of a cycle irregularity. As long as the pivot 22 is in alignment with the shaft of the cutter roll 1 and the coaxially arranged shaft of the tachometer generator 12, the cutter rolls will rotate uniformly. Only after the adjustment of the correcting element 21 in one or the other direction will an asymmetry result between the shafts of the cutter roll 1 and of the tachometer generator 12.

The cross cutter according to the instant invention works in the following manner:

By applying the reference input W to the speed regulating device 16, the basic speed of the driving motor 10 is set. The length of the individual sheets cut by the cross cutter depends on this speed and the speed of the conveyed web of goods. However, the speed of the web and the number of revolutions have to be synchronized to one another in such manner that synchronism is achieved between the knives 7, 8 and the web during the cut. In order to obtain a cut in synchronism at a specific speed of the web and a basic speed of the driving motor coordinated thereto, except for the special case that the knives 7, 8 travel during the same time the same path as the web of goods, the cutter rolls will have to be accelerated or retarded during their rotation. Therefore, the number of revolutions of the driving motor 10 have to increase and decrease periodically. The corresponding cycle of irregularity of the number of revolutions is adjusted only at the coupler mechanism 11. Although asymmetrically driven by the driving motor 10, the coupler mechanism will then deliver on the power takeoff side a uniform number of revolutions per unit time for the tachometer generator 12. From here a constant control input T will go to the speed regulating device 16, the value of which corresponds to that of the reference input W. If a disturbance variable appears in the automatic control system, e.g., the degree of irregularity of the coupler mechanism 11 is changed, the speed regulating device 16 acted upon by the tachometer generator 12 of the outlet of the coupler mechanism 11 will send a control input S to the controlled system 10-15.

Since the coupler mechanism 11 only has to drive the tachometer generator 12, it can therefore have small dimensions so that it will yet only represent a control coupler mechanism. The forces and power required during the acceleration and retardation of the cutter rolls 1, 2 are directly absorbed in this cross cutter by the motor 10 and taken out of the system on power supply 17 or fed into the system.

It will be appreciated that the instant specification and examples are set forth by way of illustration and not limitation, and that various modifications and changes may be made without departing from the spirit and scope of the present invention.

What is claimed is:

1. A cross cutter for a moving web, comprising coupled cutter rolls; a driving motor directly coupled to the cutter rolls for driving same; asymmetrical means driven by the driving motor in parallel with the cutter rolls for producing a control output corresponding to the actual number of revolutions per unit time of the motor; and means receptive of the control output for controlling the motor speed to synchronize the cutter rolls with the speed of the moving web.

2. A cross cutter according to claim 1, wherein the means for controlling comprises a speed regulator having a P.I.D. characteristic for producing a second control output, a current regulator having a P.I.D. characteristic and which is receptive of the second control output of the speed regulator for producing a third control output, a power amplifier receptive of the third control output of the current regulator and for developing the control input for the driving motor which is also applied as a control input to the current regulator.

3. A cross cutter according to claim 2, wherein the power amplifier includes thyristor control elements triggered by an impulse generator disposed between the current regulator and the power amplifier, the thyristors enabling current conduction control in both directions.

* * * * *